April 4, 1950     A. F. STEIERT     2,502,900
LIQUID WAX APPLICATOR
Filed July 31, 1946
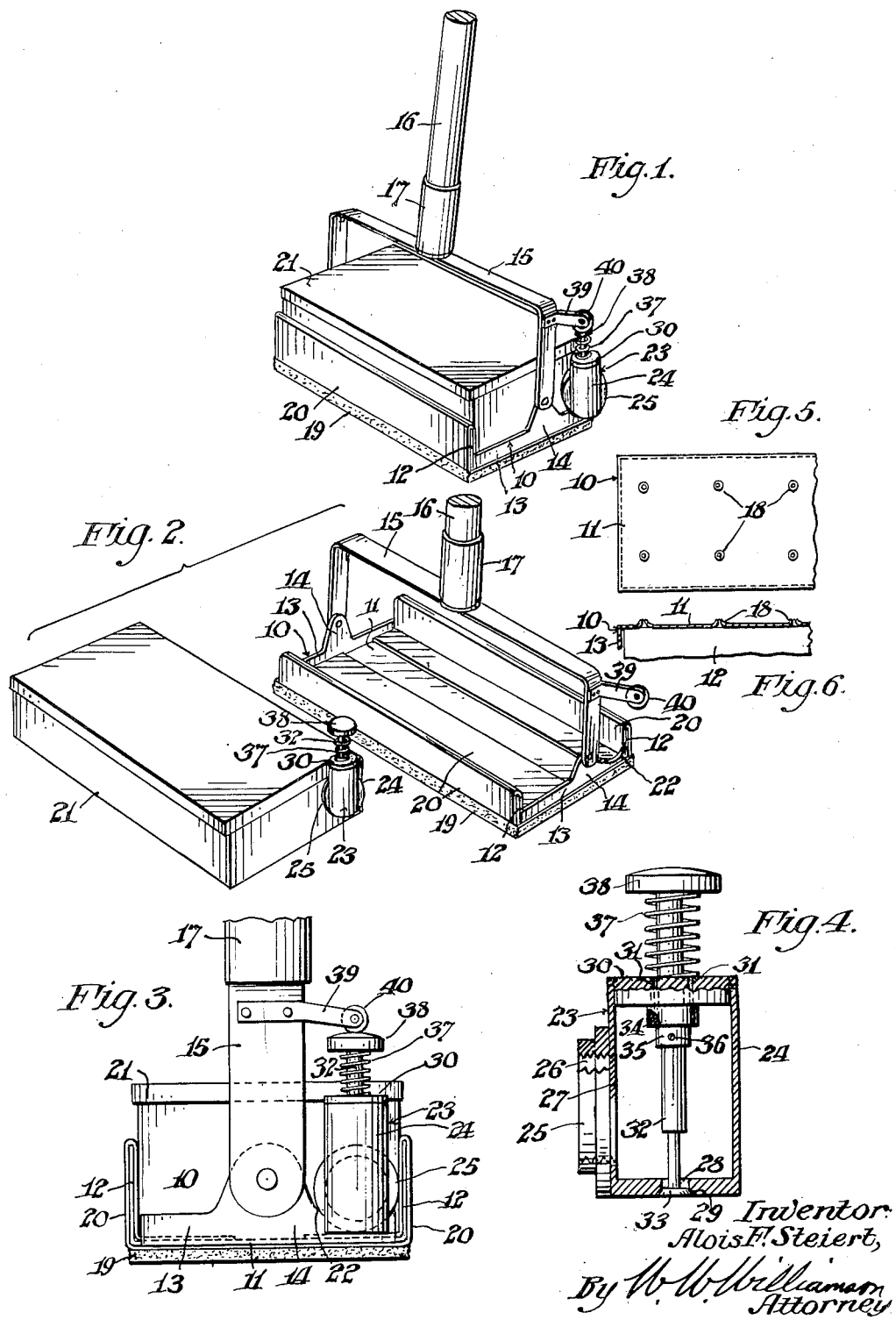

Patented Apr. 4, 1950

2,502,900

UNITED STATES PATENT OFFICE 2,502,900

LIQUID WAX APPLICATOR

Alois F. Steiert, Philadelphia, Pa.

Application July 31, 1946, Serial No. 687,331

7 Claims. (Cl. 91—25)

My invention relates to a new and useful liquid wax applicator and has for one of its objects to provide a device of this character that is simple and durable in construction, efficient in serving its purpose and inexpensive to manufacture.

Another object of the invention is to provide, in a device of the character stated, a receptacle or tray having a handle thereon and designed to receive a liquid container demountably fitted or inserted therein for supplying fluid to a surface over which the device is passed.

Another object of the invention is to so construct the receptacle or tray that the side walls will be resilient for assisting in holding the container within and an applicator pad on said tray.

Another object of the invention is to provide an applicator pad to be disposed on the underside of the tray and including flaps to be folded over the sides and lie on the inside surface of the bottom of said tray where said flaps will be temporarily clamped between the walls of the tray, particularly the resilient sides thereof, and walls of a container inserted in said tray.

Another object of the invention is to provide the bottom of the tray with a roughened outer surface to limit any tendency of the applicator pad to slide relative to the outer surface of the tray bottom.

Another object of this invention is to provide a combination stopper and outlet control valve for connection to the container and to be actuated by certain movements of the tray handle for release of the contents of the container while assembled in the tray.

A further object of the invention is to provide a combination stopper and valve including a body having a practically unobstructed liquid inlet, a liquid outlet and an air inlet, said liquid outlet and air inlet being controlled by simultaneously functioning valves on a valve stem which is spring actuated in one direction.

A still further object of the present invention is to provide, in combination, a tray having resilient side walls, an applicator pad disposed on the underside of the bottom of said tray and having portions folded over said side walls and imposed on the inside surface of the tray and provided with a stopper valve having the operating member disposed in the path of travel of a finger carried by a handle structure pivotally connected to the ends of said tray.

With the above and other objects in view, which will become apparent from the following description, this invention consists of certain details of construction and combination of elements hereinafter set forth and then designated by the claims.

In order that those skilled in the art to which this invention appertains may understand how to make and use the same I will describe a particular construction in detail referring by numerals to the accompanying drawing forming a part hereof, in which:

Fig. 1 is a perspective view of a complete assembly of a liquid wax applicator embodying the elements and features of my invention.

Fig. 2 is an exploded view showing in perspective the tray or receptacle with the applicator pad thereon and the container having the combination stopper and valve attached.

Fig. 3 is a slightly enlarged end view of the assembly in one position of use.

Fig. 4 is a further enlarged sectional elevation of the combination stopper and valve.

Fig. 5 is a fragmentary bottom plan view of the tray or receptacle illustrating one way of providing a roughened outer surface for the bottom of said tray.

Fig. 6 is a broken longitudinal sectional view of Fig. 5.

In carrying out my invention as herein embodied 10 represents the tray or receptacle which is, in effect, a shallow pan produced from a suitable material, such as metal, having considerable resiliency and including a bottom 11, longitudinal side walls 12 projecting upwardly from said bottom and end walls 13, likewise projecting upwardly from said bottom 11. The side walls 12 are inherently resilient and may be free from the end walls 13 so as to be capable of flexion throughout their heights or if connected with the end walls said side walls shall be higher than the end walls whereby their upper ends will be flexible.

The end walls may have ears 14 for pivotal connection with said end walls of a handle structure including a yoke 15 and a handle 16 which, for convenience of illustration only, is shown as inserted in a socket 17 fixed on the yoke. For a purpose to be presently described, the outer or underneath surface of the bottom 11 is preferably roughened and this may be done by forming or punching up projections 18 that extend slightly beyond the exterior surface of said bottom.

An applicator pad 19 of suitable soft or compressible and slightly absorbent material has pliable flaps 20. These items may be provided by fixing the actual pad to a strip of cloth midway between the ends of said strip of cloth, as by stitches.

The pad 19 is disposed on the outside of the bottom of the tray and the roughened surface prevents said pad from slipping about relative to said tray bottom. The flaps 20, Fig. 3, are carried up along the outsides of the side walls 12, then folded over said side walls and down along the insides of said side walls and the flap ends laid on the inside of the bottom.

To hold the applicator pad in place a container 21, such as a conventional can used for holding liquid wax to be sold by stores, is assembled in the tray with the applicator pad thereon by forcing the container down between the flap covered side walls 12. This will slightly flex the side walls so that the parts will be firmly held under spring tension as will be apparent and the holding action will be assisted by the container resting on the ends of the flaps which lie on the inside of the tray bottom.

The container has a filling or pouring spout which is exteriorly threaded, as is usual, and in this instance said spout is preferably located to one side of the center of the end of the container or adjacent one of the side walls of said container and has a right hand thread. In order to accommodate the container spout and also position it relative to an operating means which will actuate the valve, to be presently described, one of the end walls 13 of the tray has a notch 22 formed therein. The notch 22 is preferably located near the front end of the right hand end wall for a definite purpose that will become apparent from the description below.

The usual stopper or closure cap of the container is removed and then replaced by the combined stopper and valve 23. This combined stopper and valve includes a hollow body 24 having an interiorly threaded attaching socket 25 providing a side inlet 26 with a baffle wall 27 disposed across the upper portion thereof. The baffle wall reduces the area of the inlet so there will be no rush of fluid from the container into the body 24. In the lower end of the body is a fluid outlet 28 surrounded by a valve seat 29 and in the upper end is mounted a cap 30 having air inlet apertures 31.

A valve stem 32 is slidably mounted in the cap 30 for longitudinal vertical movements, passes through the body chamber and projects through the fluid outlet 28. The lower projecting end carries a valve 33 to coact with the valve seat 29 for controlling the output of fluid. A second valve 34, preferably in the form of a rubber washer, is mounted on the valve stem intermediate its ends, and is adjustably maintained in position, as by a ring 35, held in a desired location on the valve stem by a screw 36 or equivalent fastener. This second valve engages the inner surface of the upper end of the valve body, comprising the cap 30, and normally closes the air inlet apertures 31 whereby the inlet of air to the container may be controlled. The adjustability of the second or air valve makes it possible to close and open the fluid outlet and air inlet simultaneously and in unison.

The valves are urged toward their closed positions by a spring 37 surrounding the upper, outer projecting end of the valve stem with one end engaging the upper end or cap of the body, as the fixed element, and the other end in contact with the head or button 38, as the movable element. The head or button 38 is detachably mounted on the upper terminal of the valve stem to make it easy to assemble the parts of the combined stopper and valve.

When all of the elements of the applicator are assembled, as in Figs. 1 and 3, the head or button 38 will be in the path of travel of a finger 39 carried by the handle structure and it may be secured to one of the arms of the yoke 15 in particular.

By manipulating the handle structure in the proper direction the finger 39 will depress the head or button 38 and open the air inlet and fluid outlet valves. To reduce friction between the finger and the head or button, a small wheel 40 is mounted on said finger and the top surface of the head is convex so the wheel will have a cam effect thereon.

In practice, the apparatus is placed upon a surface, for example a floor, with the applicator pad resting flat on such surface. Then by holding the handle at an angle towards the left of the views in the drawing, with the finger 39 removed a considerable distance from the head or button 38, the device may be moved to and fro for rubbing the surface on which the pad is resting. As the fluid in the container 21 is required for application to the surface, the handle structure is moved to, towards or beyond the perpendicular position so as to bring the finger 39, or its wheel 40, into contact with the head 38 and depress said head against the action of the spring 37. This will open the valves 29 and 34 and permit the fluid contents to flow through the outlet 28 which is displaced by air passing through the inlets 31 into the valve body and thence through the container spout to said container.

When the desired amount of fluid has run out onto the surface, the handle is drawn back to permit the spring 37 to close the valves and the applicator is moved about over the surface for spreading the fluid, such as a liquid wax.

Attention is called, particularly, to the special position or location of the combined stopper and valve relative to the other parts of the assembly. Assuming that the container spout and the connector socket 25 both have right hand threads, which is most natural, then by positioning said spout so that when the container with the combined stopper and valve thereon is assembled in the tray, said stopper and valve will be in a right hand angular location relative to the finger. Therefore each time the valve mechanism is operated, the tendency is to turn the valve in a right hand direction which will tighten rather than loosen the valve on the container.

Of course I do not wish to be limited to the exact details of construction herein shown and described as they may be varied within the scope of the appended claims without departing from the spirit of my invention.

Having described my invention what I claim as new and useful is:

1. A liquid wax applicator comprising a tray having end and side walls, the latter in particular being resilient, a handle structure pivotally connected to the end walls, an applicator pad disposed on the outer surface of the bottom of said tray and having flaps folded over the side walls, a container forcibly assembled in the tray in engagement with the flaps to hold the applicator pad and container in place, said container having an outlet spout, to be disposed at one end of said tray adjacent a side thereof and means detachably mounted on the outlet spout of said container for actuation by the handle structure to control the flow of fluid from said container.

2. The liquid wax applicator of claim 1 wherein the outer surface of the tray bottom is rough to prevent slipping of the applicator pad relative to the tray.

3. The liquid wax applicator of claim 1 wherein the flaps of the applicator pad are long enough to lie on the inside of the bottom of the tray under the container.

4. In a device of the class described, the combination of a tray, an applicator pad disposed on the outside of said tray with portions folded over side walls, a fluid holding container inserted in said tray and having an outlet spout, a combined stopper and valve detachably mounted on the container spout, said stopper and valve including a body with a side liquid inlet and a valve seat surrounded liquid outlet at the lower end and air inlets at the upper end, a valve stem passing through said body and projecting beyond the upper end, valves on said stem positioned for simultaneously controlling the liquid outlet and air inlets, a head on the upper end of the valve stem, means to urge the valves towards the closed positions, and a handle structure pivotally connected to the tray and including means for coaction with the head to open the valves.

5. The structure of claim 4 in combination with means on the tray to limit sliding movements of the pad relative to said tray.

6. The structure of claim 4 wherein the tray has a notch to receive the container spout for locating said spout in the tray.

7. The structure of claim 4 wherein the means for opening the valves comprises a finger on the handle structure, and a wheel on said finger to engage the head on the valve stem.

ALOIS F. STEIERT.

REFERENCES CITED

The following references are of record in the file of this patent:

UNITED STATES PATENTS

| Number | Name | Date |
|---|---|---|
| 1,346,918 | Snyder | July 20, 1920 |
| 1,910,683 | Ericson | May 23, 1933 |
| 2,358,596 | Rosenlund | Sept. 19, 1944 |

FOREIGN PATENTS

| Number | Country | Date |
|---|---|---|
| 172,670 | Switzerland | Apr. 1, 1935 |